(12) United States Patent
Lips et al.

(10) Patent No.: US 6,524,725 B1
(45) Date of Patent: Feb. 25, 2003

(54) ENAMELED STEEL AND PROCESS FOR ENAMELING A ZINC OR ZINC-ALLOY PRECOATED STEEL SURFACE

(75) Inventors: Koen Lips, Gent/Drongen (BE); Christian Schlegel, Croix (FR)

(73) Assignee: Enamels and Ceramic Coatings International C.V., Bruges (BE)

( * ) Notice: Subject to any disclaimer, the term of this patent is extended or adjusted under 35 U.S.C. 154(b) by 0 days.

(21) Appl. No.: 09/719,418

(22) PCT Filed: May 21, 1999

(86) PCT No.: PCT/EP99/03491

§ 371 (c)(1),
(2), (4) Date: Feb. 23, 2001

(87) PCT Pub. No.: WO99/66103

PCT Pub. Date: Dec. 23, 1999

(30) Foreign Application Priority Data

Jun. 12, 1998 (EP) .............................................. 98110750

(51) Int. Cl.$^7$ ........................... B32B 15/04; B05D 3/02; C23D 5/00

(52) U.S. Cl. ................. 428/633; 427/376.2; 427/376.5; 427/406; 427/419.6; 427/433; 428/630; 428/659; 428/469; 428/471; 428/332; 428/433; 428/926

(58) Field of Search ................................. 428/632, 633, 428/658, 659, 469, 332, 471, 433, 630, 926; 427/406, 419.6, 433, 376.2, 376.5

(56) References Cited

U.S. PATENT DOCUMENTS 2,056,399 A 10/1936 Hochwalt et al.
3,849,175 A * 11/1974 Kaup et al. ............... 427/376.5
3,935,088 A 1/1976 Kaup et al.
4,046,646 A 9/1977 Warnke et al.

FOREIGN PATENT DOCUMENTS

| DE | 2103368 | 8/1972 |
| GB | 818264 | 8/1959 |
| JP | 52-105921 | 6/1977 |

OTHER PUBLICATIONS

Ryuichi, T.; JP 60/169,571; Mar. 9, 1985, *Patent Abstracts of Japan.*
Kokorin, G.A., et al.; SU 1,505,981; Sep. 7, 1989; *Dewent* (XP–002086102).
Tomio, K.; JP 05/320,931; Jul. 12, 1993; *Patent Abstract of Japan.*
Katsumasa, A.; JP 09/003,660; Jul. 1, 1997; *Patent Abstract of Japan.*

* cited by examiner

*Primary Examiner*—Robert R. Koehler
(74) *Attorney, Agent, or Firm*—Venable; Ashley J. Wells

(57) ABSTRACT

Enameled steel and process for enameling a zinc or zinc-alloy precoated steel surface includes providing steel having a surface to be precoated and enameled; applying a zinc or zinc-alloy coating having a thickness ranging from 1 to 30 $\mu$m to the surface of the steel to provide the zinc or zinc-alloy precoated steel surface; subjecting the zinc or zinc-alloy precoated steel surface to a heat pretreatment at a temperature of at least 500° C.; and enameling the zinc or zinc-alloy precoated steel surface with a vitreous enamel composition which has a content of adherence-providing oxides selected from the group consisting of Co, Ni, Cu, Sb and Mn of less than 0.1% by weight for a white enamel layer and less than 2.5% by weight for a colored enamel layer by firing the vitreous enamel composition to provide a vitreous enamel layer thereon.

16 Claims, No Drawings

ENAMELED STEEL AND PROCESS FOR ENAMELING A ZINC OR ZINC-ALLOY PRECOATED STEEL SURFACE

BACKGROUND OF THE INVENTION

1. Field of the Invention

The present invention relates to steel surfaces with a zinc or zinc-alloy coating comprising a vitreous enamel layer and a process for enamelling of zinc or zinc-alloy precoated steel surfaces.

2. Description of the Related Art

Steel surfaces in particular in the form of sheet steel are a unique material for countless applications. It can be cut and shaped by bending, folding, deep drawing and punching. It has a high mechanical strength and it can easily be joined together by welding. Since iron oxidizes easily, corrosion protective surfaces in particular made of a number of metallic, organic and inorganic coatings are known. For example the coating of steel with a thin layer of zinc or zinc-alloys is well-known in the art. Furthermore, it is well-known in the art that vitreous enamel has very special properties which differ in many aspects from other coatings.

Vitreous enamel is a long established finish for metal. Vitreous enamel is an entirely inorganic finish related to the glass family. It mainly is based on quartz, boron oxide, aluminium oxide, (earth) alkaline oxides and fluorine, which are crosslinked to a three-dimensional network. According to the requested application, a variety of vitreous enamels differing widely in chemical composition, are used in practice.

Vitreous enamelled products are widely used in different applications for example in washing machines, sanitary ware such as bath tubes, shower bases, cooking ranges, domestic appliances as well as internal and outside construction materials. The vitreous enamel is applied to the substrate surface after an intensive pretreatment to insure and improve the adherence of the enamel. In order to improve the adherence of the enamel, customarily a very complicated pretreatment as well as a high firing temperature is required. The pretreatment causes a serious problem of large amounts of waste liquids. When steel sheet is used for enamelling, the procedure for direct white enamelling can be described as following: rinsing, degreasing, rinsing, pickling, rinsing, nickling, rinsing, passivating, rinsing, applying the enamel and firing typically at a temperature in the range of 800 to 900° C. By this firing an adherence providing intermetallic layer of the Fe—Ni—Ti-type is formed at the interface between steel and enamel whereby Ti comes from the used frits and Ni is the customarily used material for the pretreatment. The procedure for a two coat one fire enamelling can be described as following: rinsing, degreasing, rinsing, pickling, rinsing, passivating, rinsing, applying ground enamel layer, applying top enamel layer, firing at a temperature between typically 800 and 900° C. By this firing the adherence is caused by reactions between the Ni-, Co-, Cu-, Mn- and/or Sb-ions of the ground enamel and the iron/iron ions coming from the steel.

JP 95-176857 A corresponding to JP 09003660 discloses enamelling of a zinc-alloyed surface without pretreatment. A steel sheet is provided with the layer of alloyed Zn on the surface by alloying just after the dipping in the Zn-bath. With respect to the enamel frit a firing temperature of up to 600° C. is disclosed. However, this reference discloses that firing at a temperature above 550° C. shows that the Fe-content of the intermediate phase is in excess of the optimum range, so that the formability of the substrate is extremely lowered. As a consequence, the adherence of the enamel is low. The reference does not discuss any specific kind of steel to be used.

JP 60-169571 A discloses an enamel coated steel plate obtained by forming an enamel coating on an aluminum zinc-alloy coating formed on plates. The coated steel plate is used for facing materials, flat plates, and embossed plates in applications of sidings, sash, interiors, and roofings. Low costs, high corrosion, wear, chemical, and weather resistances are provided along with good ceramic image, and high dimensional stability. The Al-Zn plated coating may contain La, Ce, Mg as an additive to improve wettability to the steel, coating layer and qualities with contents about 0.01 to 0.5% of the plating layer. Due to the low melting point of aluminum the firing requires a temperature of less than 660° C.

JP 52-105921 discloses enamelling steel plates having firmly adhered coatings with pretreatment including electrodeposition of zinc. The steel plate containing more than 0.03% C is preliminary washed with acid and then treated with Ni. It is then electroplated with Zn in electrolytic solution, and coated with a titanium white enamel, dried and burned. The Zn is plated to a thickness of 0.1 to 1 $\mu$m. The steel plate has firmly adhered enamel coating and formation of foams is avoided. U.S. Pat. No. 2,056,399 discloses a coating process and coated articles. The reference discloses the application to the article of an intermediate layer of a surfacing material having the desired tenacity imparting, and the desired rust resisting characteristics. The material is applied through the use of a metal which is capable of producing a thin, spongy, metal like layer, zinc being preferably used on account of its commercially availability at low cost.

GB-A-818,264 discloses enamelled ferrous articles. The first step of the process consists in a heat treatment of a zinc or cadmium coated steel sheet or article in order to allow the zinc or cadmium to diffuse into the metal. That layer is provided with the frit which may be of any of the general composition recommended for enamelling aluminum.

U.S. Pat. No. 3,849,175 corresponding to DE-A-21 03 368 and U.S. Pat. No. 3,935,088 corresponding to DE-A-20 45 265 disclose a method for coating steel parts with enamel. The method relates to the direct application of enamel to steel parts consisting of coating the surface of the steel parts with a zinc layer of between 0.3 to 5 g/m² before the enamel coating is applied over the zinc layer in order to suppress defects which occur in the surface of the steel parts and provide a long-lasting enamel surface. Taking into account that a surface layer of 7.13 g/m² relates to 1 $\mu$m, a very thin zinc layer is provided. U.S. Pat. No. 3,935,088, column 2, line 27 ff. discloses that the coating of metal should not be too thick, for otherwise the enamel adhesion is poor.

Thus, it is the object of the invention to enamel a zinc or zinc-alloy coated steel surface directly with an enamel by avoiding either the application of a pretreatment with Ni or by avoiding the application of a ground coat as a kind of adhesive. Furthermore, no pickling step is required, whereby the selected vitreous enamel composition should have a firing temperature as high as possible.

SUMMARY OF THE INVENTION

Thus, in a first embodiment of the invention the above mentioned objective is attained by a steel surface with a zinc or zinc-alloy coating having a thickness in the range of 1 to 30 $\mu$m and in contact thereto comprising a vitreous enamel layer being essentially free of adherence providing oxides selected from the group of Co, Ni, Cu, Sb or Mn.

Thus, the present invention in particular avoids the use of an adherence providing nickel layer on the steel surface and the use of adherence providing oxides in the composition of the vitreous enamel.

As distinct from the enamels used for enamelling aluminium and aluminised steel sheet, whose chemical resistance is poor compared to the conventional steel enamels, the vitreous enamels for enamelling a zinc or zinc-alloy coated steel substrate can reach the same chemical resistance (alkaline or acid) as do the conventional steel enamels.

DESCRIPTION OF THE PREFERRED EMBODIMENT

In a preferred embodiment of the present invention the appropriate metal substrate has to be selected carefully. The inventors have found that certain qualities of steel are particularly suited for direct enameling according to the present invention. Mainly cold rolled steel sheet with carbon contents of less than 0.08% by weight are preferably used according to the present invention. In particular, preferred are ultra low carbon steels having a carbon content of less than 0.004% by weight or interstitial free steel, i.e., all carbon is bound in insoluble precipitates. Although in principle any commercial steel substrate can be used, it is preferred according to the present invention to decrease the degassing during the firing. Thus, it is in particular favorable to work with an ultra low carbon steel or an interstitial free steel.

In a further preferred embodiment the zinc-alloy layer contains at least 50% by weight of zinc and in particular up to 15% by weight of other alloy components. Thus, the zinc-alloy layer may contain besides zinc other metals in particular selected from the group of Al, Fe, Mg, Si, Cr, Ni, Co, Cu or Mn together with usual impurities which may but not compulsory has to be preannealed before enamelling. In case a preannealing step is performed, it may be done in line with the metallic precoating or it may be done separately. The metallic precoating can be applied directly on the steel surface in particular a steel sheet as well as on the raw product (after cutting, deforming and welding/joining). The usual methods for the application of zinc or zinc-alloys may be used according to the present invention. Thus, in particular the zinc or zinc-alloy layer is preferably directly applied on the used steel sheet by galvanizing, galvannealing or electroplating. One or more of the following methods can be used for precoating the raw products for example imersion in a liquid metallic bath, thermal spraying and/or electroplating.

Preferably, the zinc or zinc-alloy layer applied to the steel surface has a thickness in the range of 7 to 25 μm. Depending on the kind of application of the zinc or zinc-alloy layer a further pretreatment may be used. During this pretreatment a temperature in the range of 400 to 700° C. is preferably used. A heat pretreatment at a temperature of at least 500° C. prior to enameling is most preferred. In an alternative thereto it is of course possible to subject the zinc or zinc-alloy coated substrate prior to the enameling to a usual alkaline pretreatment or a conversion process treatment (for example phosphating).

In case that the substrate contains welded parts of zinc coated sheets those welding seams are best precoated afterwards with a zinc or zinc alloy layer or a zinc rich containing organic coating.

The enamelling process itself can be performed as usual. Thus, the vitreous enamel can be applied either in form of a wet slip or a dry powder on the metallic part. To cover all possible applications, a variety of deposition techniques can be used, for example wet dipping, spraying, flow coating, wet electrophoretic, wet electrostatic, powder electrostatic. The vitreous enamel may be applied in one or several layers. The firing of the vitreous enamel layer preferably has to be performed at a temperature lower than the sublimation temperature of the zinc or zinc-alloy layer. Thus, the preferred temperature range for the firing is a temperature in the range of 700 to 900° C. and in particular 720 to 880° C. All colors may be obtained by using the specific technique of the present invention. Thus, the present invention allows to obtain white or light colored vitreous enamel coatings in one or several layers. Previously those colors were obtained by using a multi-coating technique whereby a ground enamel layer has been applied to the pretreated surface followed by the white or light top coat or by using a nickel pretreatment. The present invention however allows the production of such surfaces with much lower costs by the avoidance of the above mentioned multi-coating technique or Ni pretreatment and thus is highly ecological. In particular, when a preannealing step is performed after the molding of the piece and prior to the enamelling no further pretreatment in particular no degreasing, rinsing, pickling, nickling etc. is needed resulting in that no waste water is produced.

Another advantage of the present invention is the opportunity of enamelling only one side of a substrate, i.e. a working piece or a panel. The other non-visable backside is sufficiently corrosion protected by the zinc layer.

During the firing at high temperatures, a lot of chemical and physical reactions occur between the components of the metallic coating, the components of the steel and the components of the enamel. The reactions that take place are diffusion, alloying, precipitation, melting, oxidation, reduction etc. According to the present invention a good adherence is achieved due to all those reactions of the different components. Thus, according to the present invention the vitreous enamel layer preferably has a thickness in the range of 30 to 500 μm and in particular 60 to 300 μm.

For the preparation of white enamel layers the maximum amount of the above mentioned adherence providing oxides like Ni, Co, Cu, Sb or Mn should be preferably less than 0.1% by weight.

For the preparation of colored enamel layers the maximum amount of those oxides should be preferably less than 2,5% by weight, respectively. It is to be noted that those oxides in case they are present in the vitreous enamel are not used for adherence purposes but expressly are used for colouring the enamel only.

Under any circumstance the maximum amount of adherence providing oxides selected from the group of Co, Ni, Cu, Sb or Mn should be less than 3,5% by weight.

The invention is furthermore exemplified by the following examples without restricting the invention thereto. The compositions are indicated in weight % respectively.

EXAMPLES

Example 1

A steel gauge having a thickness of 0.9 mm was galvanized with a Zn layer having a thickness of 15 μm.

Composition of the used vitreous enamel:

| | |
|---|---|
| $Al_2O_3$ | 0.1 |
| $B_2O_3$ | 17.5 |
| F | 2.7 |
| $K_2O$ | 7.1 |
| $Na_2O$ | 8.0 |
| $P_2O_5$ | 2.2 |
| $SiO_2$ | 43.7 |
| $TiO_2$ | 15.7 |
| ZnO | 2.2 |
| $ZrO_2$ | 0.8 | with a glass transformation temperature of 460° C. and a softening temperature of 520° C. was deposited on the above mentioned surface by wet spraying resulting a deposited weight of 500 g/m². The metallic sheet was fired in a box furnace at a temperature of 820° C. for 4 min.

The coating properties were visually evaluated. The adherence test according to EN 10209 resulted in a value of 2. The surface was o.k.

Example 2

A steel gauge having a thickness of 0.9 mm was galvanized with a Zn layer having a thickness of 15 μm. The metallic sheet was preannealed in a continuous furnace at a temperature of 600° C. with a chain velocity of 0.6 m/min.

Composition of the used vitreous enamel:

| | |
|---|---|
| $Al_2O_3$ | 0.9 |
| $B_2O_3$ | 2.5 |
| BaO | 0.3 |
| CoO | 0.1 |
| F | 3.1 |
| $K_2O$ | 0.9 |
| $Li_2O$ | 2.2 |
| MnO | 2.0 |
| $Na_2O$ | 15.6 |
| $SiO_2$ | 63.1 |
| $TiO_2$ | 5.0 |
| $ZrO_2$ | 4.3 | with a glass transformation temperature of 428° C. and a softening temperature of 478° C. was deposited on the above mentioned surface by wet spraying resulting a deposited weight of 500 g/m². The metallic sheet was fired in a continuous furnace at a temperature of 850° C. with a chain velocity of 0.6 m/min.

The coating properties were visually evaluated. The adherence test according to EN 10209 resulted in a value of 2. The surface was o.k.

Example 3

A steel gauge having a thickness of 0.8 mm was galvannealed with a Zn/Fe layer having a thickness of 8 μm.

Composition of the used vitreous enamel:

| | |
|---|---|
| $Al_2O_3$ | 0.1 |
| $B_2O_3$ | 16.4 |
| F | 4.7 |
| $K_2O$ | 3.3 |
| MgO | 0.9 |
| $Na_2O$ | 10.9 |
| $P_2O_5$ | 1.4 |
| $Sb_2O_3$ | 2.4 |
| $SiO_2$ | 42.3 |
| $TiO_2$ | 13.4 |
| $V_2O_5$ | 1.5 |
| ZnO | 2.7 | with a glass transformation temperature of 452° C. and a softening temperature of 495° C. was deposited on the above mentioned surface by electrostatic powder resulting a deposited weight of 400 g/m². The metallic sheet was fired in a continuous furnace at a temperature of 820° C. with a chain velocity of 0.6 m/min.

The coating properties were visually evaluated. The adherence test according to EN 10209 resulted in a value of 2. The surface was o.k.

Example 4

A steel gauge having a thickness of 0.8 mm was galvannealed with a Zn/Fe layer having a thickness of 8 μm.

Mean composition of the 3 used vitreous enamels:

| | |
|---|---|
| $Al_2O_3$ | 0.8 |
| $B_2O_3$ | 17.6 |
| F | 0.9 |
| $K_2O$ | 7.6 |
| $Li_2O$ | 0.6 |
| MgO | 0.7 |
| $Na_2O$ | 8.3 |
| $P_2O_5$ | 2.5 |
| $SiO_2$ | 38.4 |
| $TiO_2$ | 20.3 |
| ZnO | 0.5 |
| $ZrO_2$ | 1.8 | with a glass transformation temperature of the different frittes of 467–495–503° C. and a softening temperature of 505–535–536° C. was deposited on the above mentioned surface by ETE (electrophoretic) resulting a deposited weight of 500 g/m². The metallic sheet was fired in a continuous furnace at a temperature of 820° C. with a chain velocity of 0.6 m/min.

The coating properties were visually evaluated. The adherence test according to EN 10209 resulted in a value of 1. The surface was o.k.

What is claimed is:

1. An enameled steel, comprising:
   steel having a surface coated with a zinc or zinc-alloy layer having a thickness ranging from 1 to 30 μm; and
   a vitreous enamel layer which is provided on and in contact with the zinc or zinc-alloy layer and which has a content of adherence providing oxides selected from the group consisting of Co, Ni, Cu, Sb and Mn which is less than 0.1% by weight for a white enamel layer and less than 2.5% by weight for a colored enamel layer.

2. The enameled steel according to claim 1, wherein the steel has a carbon content which is less than 0.08% by weight.

3. The enameled steel according to claim 1, wherein the steel contains carbon and all carbon is bound in insoluble precipitates (interstitial free steel).

4. The enameled steel according to claim 1, wherein the zinc-alloy layer contains at least 50% by weight of zinc.

5. The enameled steel according to claim 4, wherein the zinc alloy contains additional alloy constituents selected from the group consisting of Al, Fe, Mg, Si, Cr, Ni, Co, Cu, Mn and mixtures thereof.

6. The enameled steel according to claim 1, wherein the zinc or zinc-alloy layer has a thickness ranging from 7 to 25 μm.

7. The enameled steel according to claim 1, wherein the vitreous enamel layer has a thickness ranging from 30 to 500 μm.

8. Process for enameling a zinc or zinc-alloy precoated steel surface, comprising, in the order recited:

providing steel having a surface to be precoated and enameled;

applying a zinc or zinc-alloy coating having a thickness ranging from 1 to 30 μm to the surface of the steel to provide the zinc or zinc-alloy precoated steel surface;

subjecting the zinc or zinc-alloy precoated steel surface to a heat pretreatment at a temperature of at least 500° C.; and enameling the zinc or zinc-alloy precoated steel surface with a vitreous enamel composition which has a content of adherence-providing oxides selected from the group consisting of Co, Ni, Cu, Sb and Mn of less than 0.1% by weight for a white enamel layer and less than 2.5% by weight for a colored enamel layer by firing the vitreous enamel composition to provide a vitreous enamel layer thereon.

9. The process according to claim 8, wherein the zinc or zinc-alloy layer is applied by one of galvanizing, galvannealing or electroplating.

10. The process according to claim 8, further comprising, prior to enameling, subjecting the zinc or zinc-alloy precoated steel surface to one of (A) an alkaline pretreatment or (B) a conversion process.

11. The process according to claim 8, wherein enameling includes firing the vitreous enamel layer at a temperature which is lower than the sublimation temperature of the zinc or zinc-alloy layer.

12. The process according to claim 8, wherein enameling includes firing the vitreous enamel layer at a temperature ranging from 700 to 900° C.

13. The process according to claim 12, wherein the vitreous enamel layer is fired at a temperature ranging from 720 to 880° C.

14. The enameled steel surface according to claim 2, wherein the steel has a carbon content which is less than 0.004% by weight.

15. The enameled steel according to claim 4, wherein the zinc-alloy layer contains at least 50% by weight of zinc and up to 15% by weight of additional alloy constituents.

16. The enameled steel according to claim 7, wherein the vitreous enamel layer has a thickness ranging from 60 to 300 μm.

* * * * *

UNITED STATES PATENT AND TRADEMARK OFFICE
CERTIFICATE OF CORRECTION

| | | |
|---|---|---|
| PATENT NO. | : 6,524,725 B1 | Page 1 of 1 |
| APPLICATION NO. | : 09/719418 | |
| DATED | : February 25, 2003 | |
| INVENTOR(S) | : Lips et al. | |

It is certified that error appears in the above-identified patent and that said Letters Patent is hereby corrected as shown below:

On the Title Page

(73) Assignee: "Enamels and Ceramic Coatings International C.V., Bruges (BE)" should be -- Pemco Brugge N.V., Brugge (BE) --

Signed and Sealed this
Twenty-fifth Day of August, 2015

Michelle K. Lee
*Director of the United States Patent and Trademark Office*